May 19, 1959 J. M. LAZAR 2,887,335
SEALS
Filed Feb. 25, 1957 2 Sheets-Sheet 1
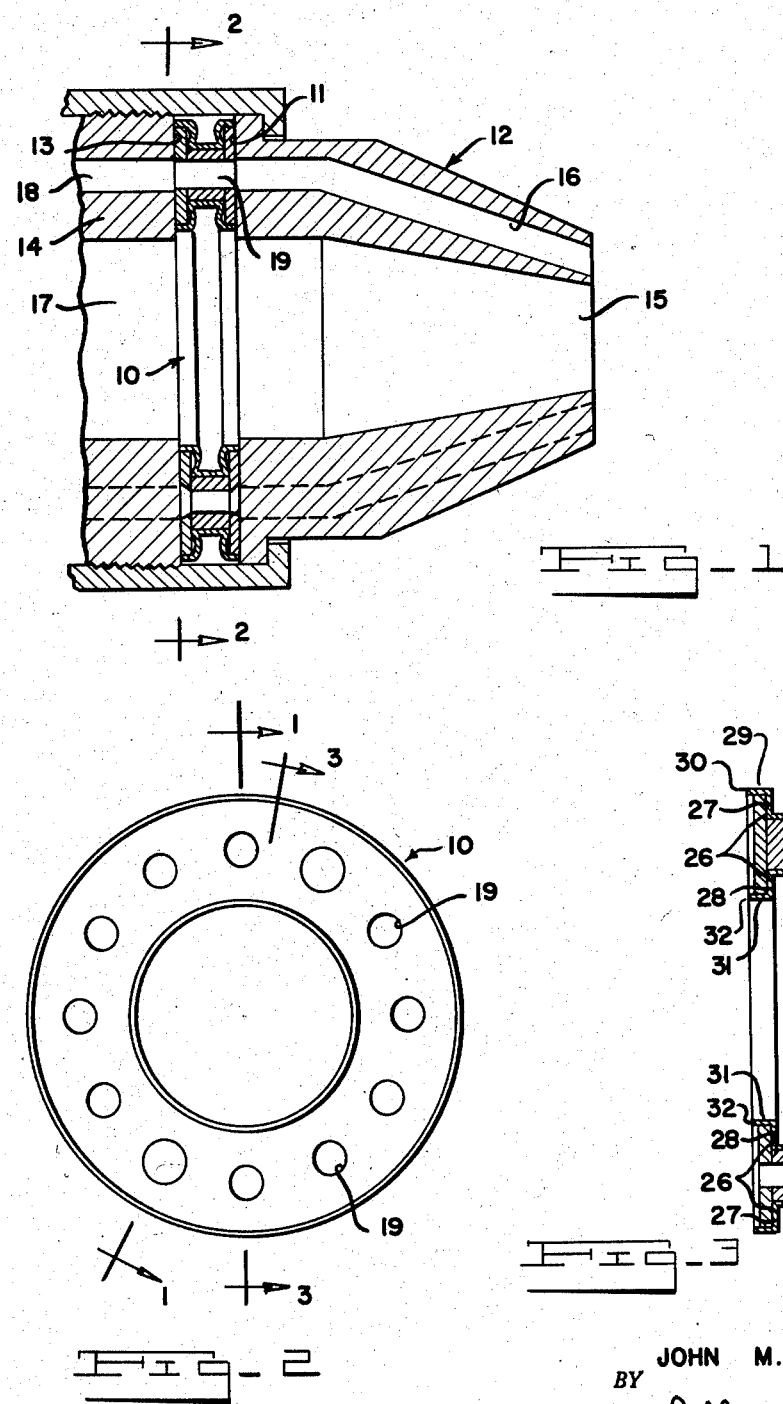
INVENTOR.
JOHN M. LAZAR
BY
Cullen & Canton
ATTORNEYS May 19, 1959  J. M. LAZAR  2,887,335
SEALS Filed Feb. 25, 1957  2 Sheets-Sheet 2

INVENTOR.
JOHN M. LAZAR
BY
Cullen & Canton
ATTORNEYS

2,887,335
SEALS

John M. Lazar, Detroit, Mich.

Application February 25, 1957, Serial No. 642,252

17 Claims. (Cl. 288—21)

This invention relates to seals, and more particularly to a seal useful for sealing against and between two opposed faces which are compressed towards each other.

An object of this invention is to form a sealing ring or sealing means for use between two spaced faces which are to be sealed to each other, which sealing means maintains a tight gas proof and liquid proof seal at very high as well as at low temperatures.

Another object of this invention is to form a sealing ring or sealing means having peripheral flange sealing faces arranged to form a flat face to face contact with two opposed faces to be sealed to each other and wherein the flanges are movable and squeezable towards each other but wherein at the same time the flange faces maintain their tight face to face contact with the faces to be sealed.

These and other objects of this invention will become apparent from reading the following disclosure of which the attached drawings form a part.

With reference to the attached drawings, in which:

Fig. 1 is a cross-section illustration, taken in the direction of arrows 1—1 of Fig. 2, of the sealing means of this invention squeezed between two faces to be sealed; in this illustration the faces being a jet nozzle for injecting fuel into a combustion chamber, and a hose connection leading to the nozzle.

Fig. 2 is a plan view of the sealing means and is taken in the direction of arrows 2—2 of Fig. 1.

Fig. 3 is a cross-sectional view of the sealing means taken through arrows 3—3 of Fig. 2.

Figure 4:
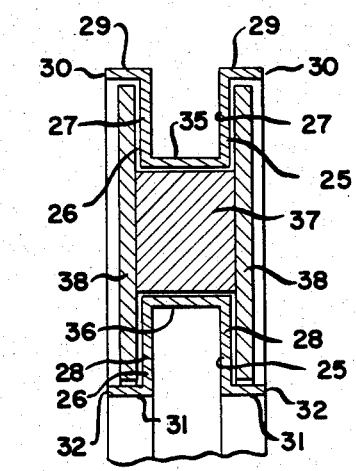
Fig. 4 is an enlarged cross-sectional fragmentary view of the sealing means.

By way of illustration, the sealing means 10 is illustrated in Fig. 1 as sealing between a face 11 of a fuel jet nozzle 12 and a face 13 of a hose or fuel passageway connection 14.

The jet nozzle is formed with a center fuel passageway or air passageway 15 and side passageways 16, and the hose connection 14 is likewise provided with passageways 17 to connect into passageway 15 and small side passageways 18 to connect into passageways 16. In this application, the sealing means is likewise provided with openings 19 aligned with openings 16 and 18 as well as a center opening aligned with openings 15 and 17.

From the above illustration, it can be seen that the function of the sealing means is to tightly seal two opposed spaced faces so as to prevent any leakage of gases or liquids around these faces.

The structure of the sealing means illustrated in Fig. 1 will now be described in relation to Figs. 2—4.

The sealing device of this invention, is formed of two spaced ring shaped flat sheets 25 and 26 which are formed of a material having an inherent springiness. The material must also be substantially unaffected by high temperatures where the device is used in an application such as a nozzle for a burner as in Fig. 1. One material found suitable for the above application is Inconel–X.

The sheets are formed of outer portions 27 and inner portions 28, with the outer portions terminating in flanges 29 bent normal to the sheet at a sharp angle, and having flange sealing faces 30. The inner sheet portions 28 likewise are formed with flanges 31 having flange sealing faces 32. The sealing faces 30 and 32 are substantially coplanar.

The sheets are anchored in a continuous line parallel to the line of the flanges and at a point remote from the flanges for reasons to be described below. The means for anchoring the sheets in Fig. 4 as well as for spacing the sheets, consists of cross-bars or cross-members 35, for the upper portions 27, and 36 for the lower portions 28. Note, that the cross-members 35 and 36 join their appropriate sheet portions at a sharp angle.

With this construction, it can be seen that the upper sheet portions 27 and their flanges are made integral or out of one piece along with the cross-member 35 and the same is true of the lower sheet portions 28 and their cross-member 36.

In addition to the above, a spacer ring 37 is interposed between the sheets and extends to the outer surfaces of the sheet. In addition, spacer plates 38, in the form of flat rings, are positioned at the outer surfaces of each of the sheets within the flange boundaries, and preferably slightly spaced from the flanges as well as from the sheet surfaces by means of the spacer 37.

The spacing plates are of a lesser thickness than the extended length of the flanges 29 and 31 as shown in Fig. 4.

Figure 5:
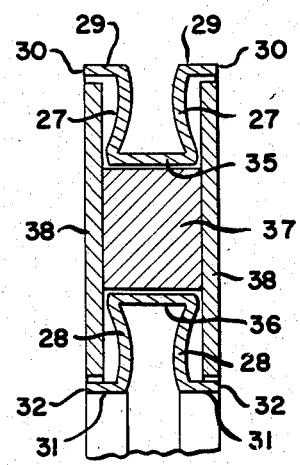
Fig. 5 illustrates the same view as Fig. 4, but with the sealing means under compression.

In operation, when the sealing means is placed between the two faces to be sealed together, the faces to be sealed are squeezed towards one another whereby the flange sealing faces 30 and 32 are squeezed towards each other respectively as shown in Fig. 5. When this happens, the upper sheet portions 27 and the lower sheet portions 28 bow inwardly and thus, the faces 30 and 32 on each sheet remain coplanar. The squeezing together of the flanges stops when the spacing plates 38 come into contact with the surfaces or faces to be sealed.

The spacing plates are so dimensioned in thickness that when the flanges are squeezed together they remain within their elastic limits and thus, may easily recover and return to their normal positions (shown in Fig. 4) when the squeezing pressure is released. Also, because of the sharp bends, and the cross-sectional configuration wherein the flanges are normal to the sheet parts and the sheet parts are anchored at a point remote from the flanges, the bowing action shown in Fig. 5 takes place and results in good sealing between the faces 30 and 32 and the surfaces to be sealed against.

Figure 6:
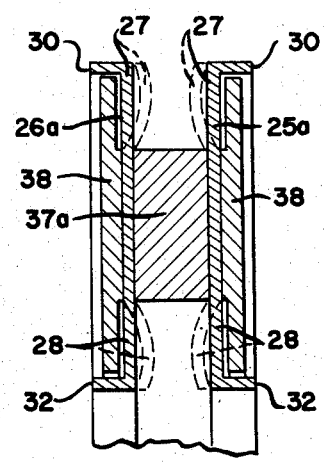
Figs. 6, 7 and 8 illustrate slight modifications of the sealing means and are cross-sectional fragmentary views similar to Figs. 4 and 5.

With reference to the modification of Fig. 6, the construction here is substantially the same as that of Figs. 1 to 5 with the exception that the sheets 25a and 26a are made in one piece, rather than in two separated parts and are joined together by a spacer 37a which is secured to each of the sheets. In all of these cases, the spacers may be formed of some metallic material or the like which is substantially unaffected by heat, particularly where the device is used in sealing parts subjected to high temperature. Thus, the spacer may be welded or brazed or otherwise permanently affixed to the sheets. In this modification, the operation is the same as that shown in Fig. 5 wherein the upper sheet part 27 and the lower sheet part 28 bow inwardly as illustrated in dotted lines. Again in this case, the flanges are normal to the sheets, and the sheets are anchored at a continuous line parallel to the flanges, but remote from the flanges, by means of the spacer 37a.

Figure 7:
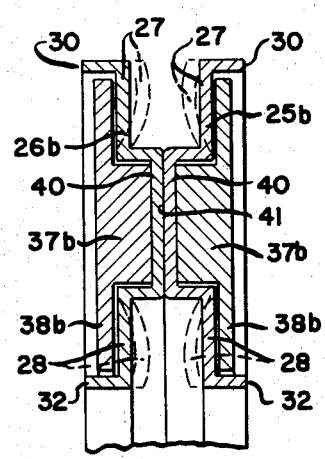

With reference to Fig. 7, the sheets 25b and 26b are formed with indentations 40 which are secured together at 41 by brazing or welding or the like and the spacer 37b may be formed integral, if desired, with the spacer plate 38b. This modification operates in the same way as does Figs. 5 and 6, with the bowing in action occurring in the same way as is illustrated in dotted lines.

Figure 8:
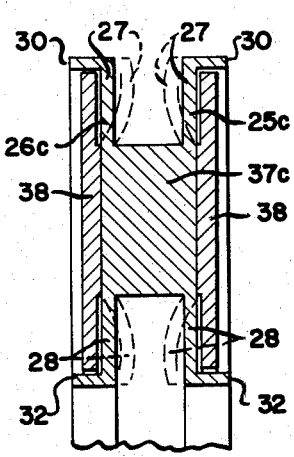

Finally, with reference to Fig. 8, the device is shown as being made of a single extruded part or a single machined part wherein the sheets 26c and 25c are formed integral with the spacer 27c. In all other respects, this device is similar to those mentioned above.

This invention may be further developed within the scope of the following attached claims. Accordingly, it is desired that the foregoing description be read as being illustrative of operative embodiments of my invention and not in a strictly limiting sense.

I now claim:

1. A sealing ring for sealing between two opposed faces to be sealed together and which are squeezed together, comprising a pair of spaced, thin, springy sheets, each having a peripheral edge flange bent at a sharp right angle and forming a sharp right angle on the outside of the bend and being normal to the sheet body with the flanges extending away from each other and from their sheets at right angles relative to the sheets; the flanges being of a considerable length, and with the flanges terminating in substantially flat outer faces, each flange face being formed to contact one of the two opposed faces and be squeezed towards each other by the two opposed faces to be sealed together, each of the sheets being anchored against relative movement in a continuous line parallel to their respective flanges and spaced a distance from their peripheral flanged edges, the sheets being sufficiently springy to bow towards each other between their anchor lines and their flanges wherein squeezing pressure applied to the flange faces moves the flange faces towards each other, but with the flange faces remaining parallel to their original planar positions.

2. A construction as defined in claim 1, and wherein said sheets are in the shape of flat rings with the flanges being formed on their outer peripheral edges and the rings being provided with inner flanges on their inner peripheral edges which are parallel to and extend outwardly the same distance as the flanges on the outer peripheral edges, and with the sheets likewise being anchored against relative movement along a continuous line parallel to but spaced a distance from their inner peripheral edges, and with the inner flanges likewise terminating in faces arranged coplanar with the outer flange faces.

3. A sealing ring for sealing between and against two opposed faces to be sealed together and which are squeezed together, comprising a pair of spaced thin, flat ring shaped springy sheets; each sheet having an outer and an inner continuous peripheral flange bent therefrom and substantially normal thereto and with the corresponding flanges on each sheet extending outwardly away from each other and each flange terminating in a sealing face with the sealing faces of the inner and outer flanges of each sheet being substantially coplanar; each sheet being anchored against movement relative to the other sheet at a continuous line parallel to and spaced a distance from their outer flanges and at a second continuous line parallel to and spaced a distance from their inner flanges; and the sheet portions between the respective anchor lines and corresponding flanges being sufficiently springy to bow inwardly upon the application of pressure to the flange sealing faces, and said corresponding flanges being movable towards each other in a direction normal to the unbowed flat plane of their respective sheets, with the areas of the sealing faces remaining constant and remaining coplanar.

4. A construction as defined in claim 3, and wherein the sheets are spaced apart and anchored by means of a spacer ring secured to the inside or facing surfaces of the sheets.

5. A construction as defined in claim 3, and wherein each of the sheets are made in two separate inner and outer portions and with inner portions and the outer portions respectively of each of the sheets being joined together in spaced relationship and anchored by means of a cross-piece formed integral with each of them.

6. A construction as defined in claim 3, and wherein the sheets are spaced from each other and joined together and anchored by means of an indentation formed in each sheet between their flanges and with the indentation of one sheet being secured to the indentation of the other sheet.

7. A construction as defined in claim 3, and wherein the sheets are spaced from each other and joined together and anchored by means of a spacer ring formed integral with each of the sheets.

8. A sealing ring for sealing between two opposed faces to be sealed together and which are squeezed together, comprising a pair of spaced, thin, springy sheets, each having a peripheral edge flange bent normal to the sheet body with the flanges extending away from each other and from their sheets, and with each flange terminating in an outer face, each outer face being formed to contact one of the opposed faces and be squeezed towards each other by the two opposed faces to be sealed together, each of the sheets being anchored against relative movement in a continuous line parallel to their respective flanges and spaced a distance from their peripheral flanged edges, the sheets being sufficiently springy to bow towards each other between their anchor lines and their flanges wherein squeezing pressure applied to the flange faces moves the flange faces towards each other, but with the flange faces remaining parallel to their original planar positions; and spacer plates positioned against the outer surfaces of the sheets and encircled by the respective flanges, with the plates being thinner than the extended length of the flanges wherein movement of the flange faces together is limited by the point where contact is made between the plates and the faces to be sealed together.

9. A sealing ring for sealing between two opposed faces to be sealed together and which are squeezed together, comprising a pair of spaced, thin, springy sheets, each having a peripheral edge flange bent normal to the sheet body with the flanges extending away from each other and from their sheets, and with the flanges terminating in substantially flat outer faces, each outer face being formed to contact one of the opposed faces and be squeezed towards each other by the two opposed faces to be sealed together, each of the sheets being anchored against relative movement in a continuous line parallel to their respective flanges and spaced a distance from their peripheral flanged edges, the sheets being sufficiently springy to bow towards each other between their anchor lines and their flanges wherein squeezing pressure applied to the flange faces moves the flange faces toward each other, but with the flange faces remaining parallel to their original planar positions; said sheets being in the shape of flat rings with the flanges being formed on their outer peripheral edges and the rings being provided with inner flanges on their inner peripheral edges which are parallel to and extend outwardly the same distance as the flanges on the outer peripheral edges, and with the sheets likewise being anchored against relative movement along a continuous line parallel to but spaced a distance from their inner peripheral edges, and with the inner flanges likewise terminating in faces arranged coplanar with the outer flange faces; and spacer plates positioned against the outer surfaces of the sheets and between the flanges thereof, the plates being thinner than the extended lengths of the flanges and functioning as a stop means to restrict the movement of the flange faces towards each other at the point where the plates contact the faces to be sealed.

10. A sealing ring for sealing between and against two opposed faces to be sealed together and which are squeezed together, comprising a pair of spaced thin, flat ring shaped springy sheets; each sheet having an outer and an inner continuous peripheral flange bent therefrom and substantially normal thereto and with the corresponding flanges on each sheet extending outwardly away from each other and each flange terminating in a sealing face with the sealing faces of the inner and outer flanges of each sheet being substantially coplanar; each sheet being anchored against movement relative to the other sheet at a continuous line parallel to and spaced a distance from their outer flanges and at a second continuous line parallel to and spaced a distance from their inner flanges; and the sheet portions between the respective anchor lines and corresponding flanges being sufficiently springy to bow inwardly upon the application of pressure to the flange sealing faces; and spacer plates positioned on the outer face of each sheet between the flanges of that sheet and being thinner than the extended length of the flanges for functioning as a stop means to restrict the movement of the flange faces to the point where the opposed faces to be sealed contact the spacer plates, said point being within the elastic limit of the material of which the sheets are formed.

11. A construction as defined in claim 10, and wherein the plates are spaced apart and anchored by means of a spacer ring secured to the inside or facing surfaces of the sheets.

12. A construction as defined in claim 10, and wherein each of the sheets are made in two separate inner and outer portions and with inner portions and the outer portions respectively of each of the sheets being joined together in spaced relationship and anchored by means of a cross-piece formed integral with each of them.

13. A construction as defined in claim 10, and wherein the sheets are spaced from each other and joined together and anchored by means of an indentation formed in each sheet between their flanges and with the indentation of one sheet being secured to the indentation of the other sheet.

14. A construction as defined in claim 10, and wherein the sheets are spaced from each other and joined together and anchored by means of a spacer ring formed integral with each of the sheets.

15. A sealing ring for sealing between and against two opposed faces to be sealed together and which are squeezed together, comprising a pair of thin, flat, ring shaped, springy sheets, said sheets being coaxially arranged and parallel to and spaced from one another in an axial direction, the outer peripheral edge of each sheet being bent at a right angle to the sheet to form a continuous outer peripheral flange on each sheet with the flanges extending outwardly of the sheets and away from each other and the flanges being equidistantly spaced from and parallel to the ring axis and with the free ends of the flanges forming opposed outer sealing edges which are parallel to the planes of the sheets; and a spacer ring, coaxial with the sheets and arranged between them and permanently fastened to each sheet in face-to-face contact, with the spacer ring having an outer peripheral surface located within and a considerable distance from the outer peripheral edge of the sheets; the sheet portions located between the spacer ring outer peripheral surface and the flange bends bowing toward each other with the flanges remaining parallel to the ring axis and moving towards each other and the sealing edges remaining parallel to the sheets upon the application of force which squeezes the opposed sealing edges together.

16. A construction as defined in claim 15 and wherein the inner peripheral edges of the sheets are likewise bent at right angles to form inner flanges identical in form to the outer flanges and spaced inwardly towards the ring axis from an inner peripheral surface of the spacer ring and with their free edges forming opposed inner sealing edges identical to the outer sealing edges.

17. A construction as defined in claim 15, and including spacer plates positioned on the outer face of each sheet between the flanges of that sheet and being thinner than the extended length of the flanges for functioning as a stop means to restrict the movement of the flange faces to the point where the opposed faces to be sealed contact the spacer plates, said point being within the elastic limit of the material of which the sheets are formed.

References Cited in the file of this patent

UNITED STATES PATENTS

| | | |
|---|---|---|
| 1,866,160 | Griswold | July 5, 1932 |

FOREIGN PATENTS

| | | |
|---|---|---|
| 49,345 | Germany | Oct. 29, 1889 |
| 44,867 | Norway | Feb. 13, 1928 |